April 8, 1930.  K. K. KNECHT  1,753,344
METHOD OF PRODUCING DRAWINGS
Filed June 1, 1926
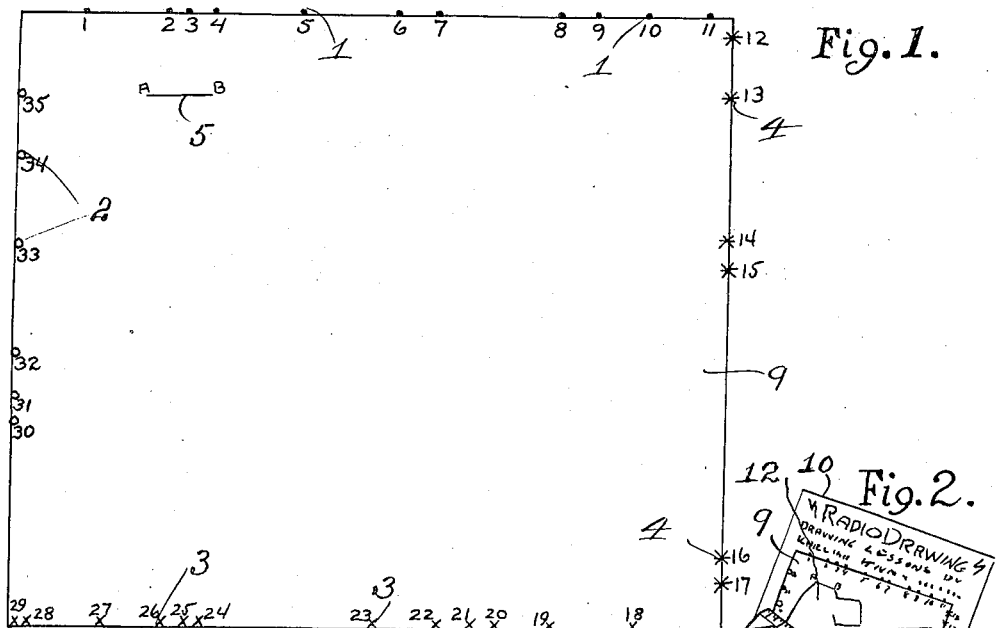
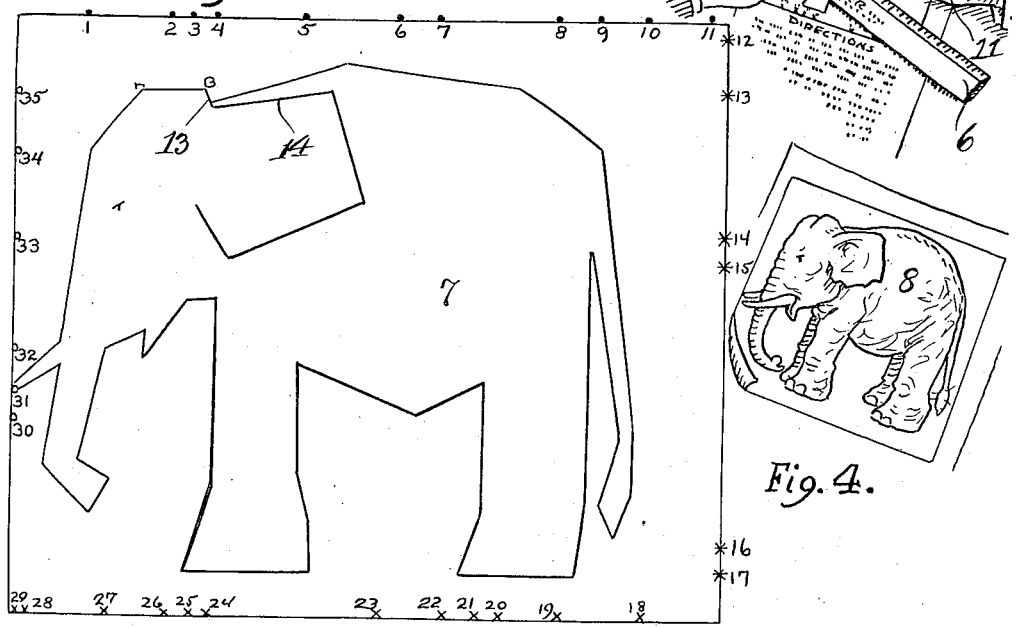
Inventor
Karl K. Knecht
By Frank C. Gore
his Attorney Patented Apr. 8, 1930

1,753,344

UNITED STATES PATENT OFFICE

KARL K. KNECHT, OF EVANSVILLE, INDIANA

METHOD OF PRODUCING DRAWINGS

Application filed June 1, 1926. Serial No. 112,932.

This invention relates to a method of producing a drawing.

My invention, while primarily intended to be practiced by the sending of instructions over the radio, is just as well adapted to be carried out by instructions given over the telephone, telegraph, orally, in the presence of the person making the drawing, or by written or printed directions which will be followed by the one who practices the method.

Regardless of the manner in which the directions for the practicing of the method are given, the means used in carrying out the method comprises a chart or diagram, whose face is blank and which has along its margins or in the region thereof, indicia, such as dots, circles, X's, asterisks—*, or other point indicating means, and numbers or letters by which said point indicating means may be identified in carrying out the instructions for making the drawing on the blank chart.

The drawing is made by the use of any ordinary ruler or straight edge, successively placed on the chart in different positions where its edge will intersect points which are designated by numbers or letters given in succession in the directions communicated over the radio or otherwise. Each line drawn by the person carrying out the directions is for a given distance as, for instance, such as may be quoted in inches or fractions thereof, but it is obvious that in this respect the invention is not limited to performance by any specific linear measure. The usual ruler, which is divided into inches having eighths, sixteenths or thirty-seconds as sub-divisions being in common use in this country, illustration is given in that connection.

The method is practiced in the manner hereinafter set forth and differs from earlier methods for communicating information which will enable the receiver to make a drawing, in that the chart or sheet is blank and the drawing is made by placing a ruler in successively differing positions on said sheet or chart starting with a base line or base point, and while the graduated edge of the ruler intersects a given terminus or point which has been plotted and also intersects another, pre-determined suitable indexed point located in the region of the margin of the chart or sheet, drawing a line of a pre-determined length along the edge of the ruler, and continuing this procedure, using other indexed points as the work advances until the drawing has been completed.

In the accompanying drawing:

Figure 1 shows a chart or blank, such as may be used by the person making the drawing when following the instructions given;

Figure 2 illustrates the manner in which the draftsman follows the directions given to him;

Figure 3 is a view of the chart on which the completed drawing is shown and

Figure 4 illustrates how the completed drawing of Figure 3 may be rounded out, shaded and other lines added to provide a more finished drawing, if desired.

The chart on which the drawing is to be made will appear as shown in Figure 1, that is, blank except that along its margins it will be provided with points identified by indicia.

The points may be in the form of dots, such as shown at 1, or circles such as shown at 2, or X's as shown at 3, or asterisks such as shown at 4. I have illustrated in Figure 1 different signs to designate the points but it will be understood that only one system will be used, for instance all of the points will be designated by dots, or all of the points will be designated by circles, or by X's, or asterisks, or check marks, or any other means or device. The points are numbered or lettered so that they may be identified in following directions. In Fig. 1, I have shown the different points identified by numerals but it is obvious that they could be identified by letters or even by words.

Points will be indicated on the face of the chart or a line will be printed as shown at 5 as a guide or beginning line for starting the drawing. As shown, this constitutes a line designated A—B.

The chart appearing in Figure 1 may have the outline shown and be a separate sheet, or it may be printed in a book or on separate sheets or appear in a newspaper or periodical.

When the invention is practiced by sending instructions over the radio, a convenient way of practicing the invention is to print in a newspaper a chart which will appear as in Fig. 1 or as modified. Subscribers to the paper can then receive instructions over the radio and make the drawing on the chart which is printed in the newspaper. This enables a newspaper to attract subscribers and to interest those who already take it, by arranging with a broad-casting station to give directions over the radio applicable to the particular chart printed in the newspaper.

It will be understood, however, as previously pointed out that the chart may be used in the practice of the method by following directions which are printed or which are given by letter, the telegraph, or otherwise.

Referring to Figure 1, the person making the drawing places a ruler (illustrated in Figure 2 at 6) at any designated point as, for instance, at the letter B of line A—B indicated by the numeral 5. The drawing or ruling edge of the ruler 6 passes over or intersects a certain dot or marking on one of the margins of the chart and the instructions given state how long a line should be drawn along the edge of the ruler 6 from the point B toward the designated dot or marking. The ruler is then placed at the extremity of the line which has been drawn and the instructions having been followed to have the ruling edge pass over another designated dot and a line of a certain length drawn, this procedure is followed. Thus, by a series of straight lines whose direction and length are plotted by the draftsman under the instructions given, a completed outline or picture is drawn as shown, for instance at 7 in Fig. 3.

Now, the draftsman can shade and change the drawing composed of straight lines as shown at 7 so that a more finished and artistic drawing may be produced with little difficulty shown at 8 in Figure 4.

The method of producing the drawing is illustrated in Figure 2 where the chart appears at 9 on a sheet 10, the ruler is shown at 6 and the pencil or drafting implement appears at 11 in the hand of the person making the drawing. The partially completed outline of the drawing shown in Figure 3 appears at 12.

Referring to the method of producing the specific drawing shown at 7 in Figure 3, the following procedure is followed. With the drawing edge of the ruler 6 resting at the point indicated by the letter B and the drawing edge crossing the number 23 on the margin, the short line 13 is first drawn for a distance of one eighth of an inch.

The next step is to place the edge of the ruler at the point B and also intersecting the point which is designated "12" on the right hand margin of the chart and to draw a line one inch long, toward the point 12, as indicated at 14. Thus, the work progresses with the ruler placed so that its edge intersects a designated point on the margin and is drawn for a given designated distance, until the complete outline of the drawing is made, the point B or the point A being used as the base point, or the terminus of a line already drawn by the draftsman being used in conjunction with one of the designated points on the margin, until the drawing is completed in outline. The person making the drawing may then shade up the different parts or break up their straight lines or angularities and obtain a more perfect representation of the object, person, animal, fowl, bird, etc.

What I claim is:

The method of producing a drawing composed of a series of lines whose length and direction follow a pre-determined plan and whose delineation will produce a complete drawing, consisting in placing a ruler or straight-edge in successively differing positions on a sheet or chart having a blank surface provided with an indexed starting point and also flanked by irregularly placed indexed points or location, successive ones of the irregularly placed indexed points being intersected by the ruler or straight-edge while lying across said blank part, drawing a line of predetermined length and position on the blank surface from the indexed starting point on the blank surface when the ruler or straight-edge is thus used, and continuing this procedure, using other ones of the irregularly placed indexed points in conjunction with a terminus of the previously drawn line as the work advances, until the drawing has been completed on the blank surface of the sheet or chart.

In testimony whereof I affix my signature.

KARL K. KNECHT.